2,520,411

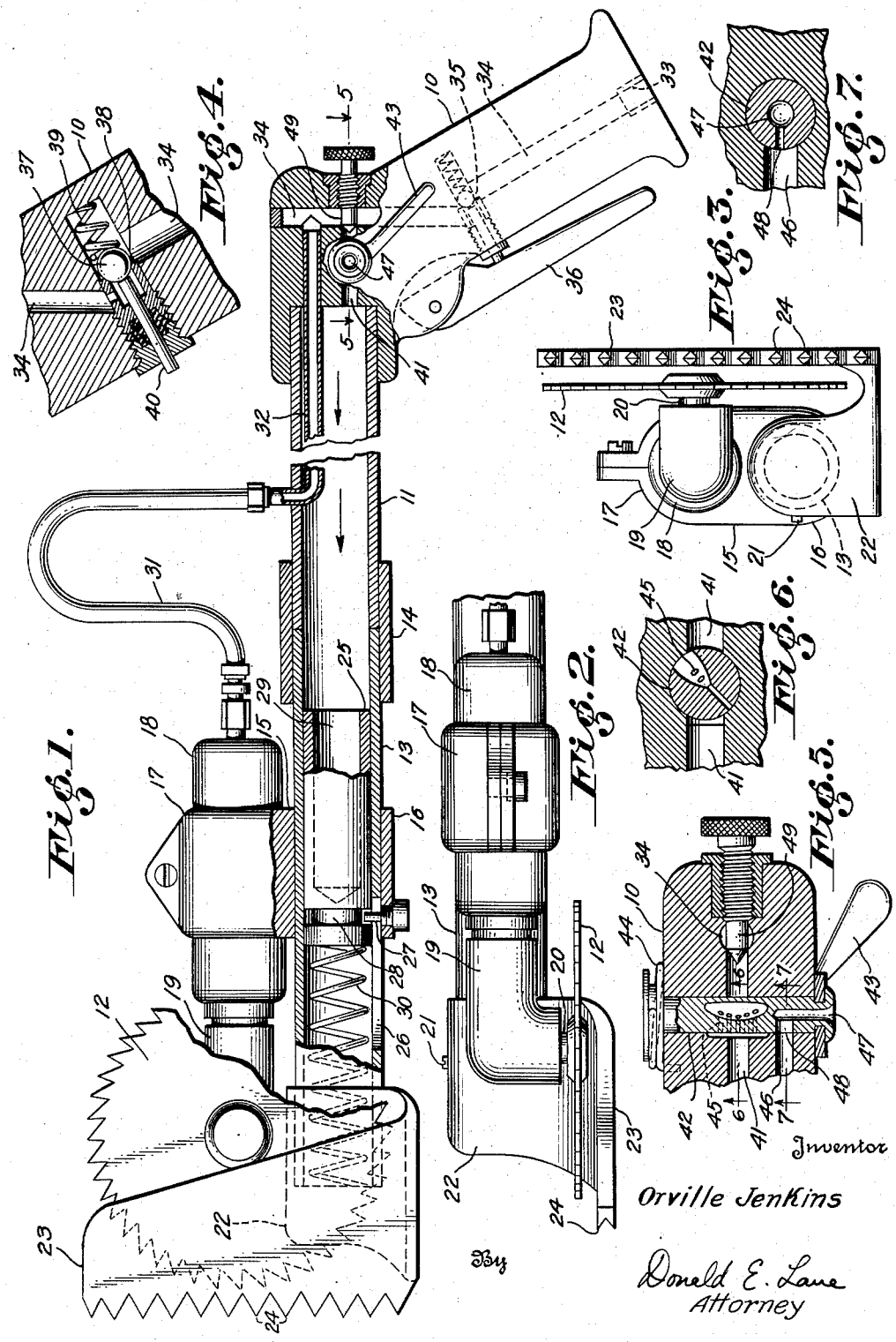
Aug. 29, 1950 — O. JENKINS — 2,520,411
ROTARY PRUNING SAW
Filed Dec. 8, 1947
Inventor
Orville Jenkins
By Donald E. Lane
Attorney Patented Aug. 29, 1950

UNITED STATES PATENT OFFICE 2,520,411

ROTARY PRUNING SAW

Orville Jenkins, Ironton, Ohio

Application December 8, 1947, Serial No. 790,381

11 Claims. (Cl. 30—167)

This invention relates to power driven cutting tools, and more particularly to a pneumatically operated portable cutting tool useful for pruning trees, trimming shrubs, cutting brush, and the like.

Pneumatic pruning tools are known, but prior art constructions possess several disadvantages. In such known implements, the rotary cutting disc usually must be advanced manually against the work during the cutting operation, thus rendering the tool somewhat unsteady in use. Furthermore, such tools contain complicated mechanisms for guiding the work to the cutting disc or for guiding the entire implement against the work.

Therefore, it is an object of this invention to provide a pneumatically operated pruning tool which may be placed in position to effect a cut and the cut made without further movement of the implement by the operator.

Another object of the invention is to provide a pruning tool having a pneumatically operated cutting disc which is advanced against the work by pneumatic means.

Still another object of the invention is to provide a pneumatically operated pruning tool with simple and conveniently mounted controls.

A further object of the invention is to provide an improved pruning tool which is simple in construction and operation and is particularly adapted for severing heavy limbs.

Other objects and advantages of the invention will be apparent from the following description and accompanying drawings in which:

Figure 1 is a side elevational view, partly in section, of a pruning implement embodying the invention.

Figure 2 is a plan view of the cutting head of the implement.

Figure 3 is an end view of the cutting head of the implement.

Figure 4 is a fragmentary detailed sectional view of one of the pneumatic control valves.

Figure 5 is a fragmentary sectional view, taken on line 5—5 of Figure 1, illustrating details of another pneumatic control valve.

Figure 6 is a fragmentary sectional view taken on line 6—6 of Figure 5.

Figure 7 is a fragmentary sectional view taken on line 7—7 of Figure 5.

Referring now to the drawings, for the purposes of illustration, the implement has three main parts, a handle, generally indicated at 10, having the pneumatic controls mounted therein, a tubular supporting pole 11, of any desired convenient length, extending from the handle, and a cutting head having a cutting disc 12 supported on the end of the pole. The cutting head will be described first.

An air cylinder 13 is secured to the end of the pole 11, by a suitable coupling 14, to form an extension thereof. A pneumatic motor carriage, generally indicated at 15, is mounted for longitudinal slideable movement on the cylinder 13. The carriage 15 comprises a sleeve portion 16 which slides on the cylinder 13 and a bracket portion 17 in which is clamped a lightweight pneumatic motor 18. The motor 18 may be of any suitable type and since constructional details of such motors are well known and form no part of this invention, further description is believed unnecessary. The cooperating surfaces of the air cylinder and the sleeve portion of the carriage are shown as cylindrical in cross-section, but any suitable cross-sectional configuration or any suitable means for mounting the carriage for longitudinal slideable movement on the air cylinder will accomplish the principles of the invention.

Supported by the motor 18 and extending forwardly therefrom is a housing 19 from which a stub shaft 20 projects at right angles thereto. The housing 19 encloses conventional shafting and gearing to drive the stub shaft 20 by the motor 18. Mounted on the stub shaft in a plane parallel to the axis of the pole 11 is the rotary cutting disc 12, preferably having a toothed edge to form a saw, as shown, but a knife edge may be suitable for certain types of cutting operations.

Mounted on the end of the air cylinder 13 and secured thereto by any suitable means, such as a set screw 21, is a cap-like element 22 which supports a relatively flat guard member 23. The guard member 23 is disposed on the free side of the cutting disc 12 and extends substantially parallel thereto. The forward edge of the guard member is serrated to provide pointed teeth 24 adapted to be engaged against an object, such as a tree limb to be severed. The forward edge of the cutting disc 12 normally is disposed to the rear of the toothed edge 24 of the guard member 23, but it will be seen that forward movement of the carriage 15 will advance the cutting disc past the toothed edge of the guard member and into cutting engagement with the work.

The carriage 15 is moved forwardly to advance the cutting disc by movement of a piston or plunger 25 slideably mounted within the air cylinder 13 and connected to the carriage. The air cylinder has a longitudinal slot 26 in the side wall thereof through which a pin 27 secured to the sleeve portion 16 of the carriage projects into an annular groove 28 on the forward end of the piston 25. Admission of compressed air to the cylinder to the rear of the piston forces the latter forward, thus advancing the cutting disc 12 into engagement with the work. The axial length of the piston 25 is sufficient to prevent air from escaping through the slot 26 when the piston is at the forward limit of its travel. If desired, the piston may be cored out, as shown at 29, for weight reduction. It will be noted that the side walls of the slot 26 guide the pin 27 to maintain straight line movement of the carriage without twisting or turning on the air cylinder 13.

When air pressure in the cylinder is relieved, the cutting disc 12 is withdrawn from the work and moved back into non-cutting position illustrated by a spring 30 which conveniently may be mounted in the cylinder 13 between the piston 25 and the cap-like element 22.

Air is admitted to the cylinder 13 through the supporting pole 11, and to the motor through a flexible hose 31 which is connected to a separate conduit 32 conveniently mounted within the pole. Any suitable source may be used to supply compressed air to the tool through the usual flexible hose (not shown) which is adapted to be secured in a connection 33 in the piston grip handle 19. The handle has a main air conduit 34 therein which provides communication between the air hose connection 33 and the motor air conduit 32. Interposed in the main air conduit 34, for controlling the flow of air therethrough, is a valve, generally indicated at 35, adapted to be opened by the hand grip lever 36. A suitable valve for this purpose is shown in Figure 4 and comprises a ball 37 pressed on a seat 38 by a spring 39. The ball is adapted to be raised from the seat by a rod or plunger 40 extending through suitable packing outwardly of the handle 19. The outer end of the rod 40 is adapted to be engaged by the hand lever 36 to open the valve.

Air is supplied to the interior of the pole 11, and, hence, to the cylinder 13, through a conduit 41 which provides communication between the interior of the pole and the main air conduit 34. The conduit 41 connects with the main air conduit 34 at a point in the latter between the valve 35 and the motor air conduit 32, so that the valve 35 also controls the supply of air to the cylinder 13. Interposed in the conduit 41 is a dual purpose rotary plug valve 42, Figure 5, rotatable by the lever 43 which may be operated conveniently by the thumb. A spring 44 extending around the valve normally retains the valve 42 in position to interrupt the flow of air through the conduit 41, but it will be seen from Figure 6 that clockwise rotation of the valve 42, upon downward movement of the lever 43 by the operator's thumb, allows air to flow through diametric passageways 45 in the valve to the cylinder 13.

The plug valve 42 also controls the flow through an exhaust conduit 46 which relieves the air pressure in the cylinder 13 and permits the spring 30 to return the cutting disc from advanced, work-engaging position rearward to the position shown in Figure 1. The valve 42 contains an axial bore 47 through one end thereof which provides communication between a radial port 48 in the valve and the atmosphere. The radial port 48 is angularly disposed with respect to the diametric passageways 45, so that in the normal position of the valve communication is provided between the exhaust conduit 46 and the atmosphere. When the valve is rotated by the thumb lever 43, however, to admit air to the cylinder 13, the conduit 46 is blocked to prevent exhaust of air therethrough. Release of the thumb lever 43 shuts off the air supply to the cylinder and simultaneously opens the exhaust conduit 46 to relieve pressure in the cylinder and permit the spring 30 to retract the cutting disc 12 from the work.

A manually adjustable needle valve 49 also is interposed in the conduit 41 to control the rate of air flow therethrough. Proper adjustment of the needle valve effects slow or fast operation of the piston 25 in response to opening the plug valve 42 by the thumb lever 43.

In operation, the tool is grasped by the handle with one hand and, if necessary, the pole 11 is supported by the other hand. The guard member 23 then is placed against a limb or branch to be severed with the teeth 24 serving to hold the tool in steady engagement therewith. The hand grip lever 36 is squeezed permitting air to flow to the motor 18 and the rotary cutting disc 12 to come up to cutting speed. The thumb lever 43 then may be pressed and the carriage 15 will advance along the cylinder 13 to carry the rotating disc 12 into cutting engagement with the work. Release of the thumb lever 43 retracts the disc 12 into non-cutting position behind the guard member 23, while release of the hand grip lever 36 stops the rotation of the disc.

It will be seen that the structure described provides a lightweight portable cutting tool which is simple in construction and operation. Structural changes which retain the principles of the invention readily will be apparent to one skilled in the art. Hence, the invention covers all embodiments which come within the spirit and scope of the following claims.

I claim:

1. A portable manually-manipulable cutting tool comprising in combination, a pole-like supporting member, a carriage sleeved for longitudinal reciprocating movement on said member adjacent one end thereof, a fluid motor and a rotary cutting disc driven thereby secured to said carriage, the plane of said disc being parallel to the direction of movement of said carriage, fluid-operated means located within said member and connected to said carriage for moving the latter toward said one end to advance said disc into engagement with work to be cut, conduit means for admitting fluid under pressure to said motor and said fluid-operated means, and valve means interposed in said conduit means for controlling the admission of said pressure fluid.

2. The structure defined by claim 1 in which the valve means includes two valves operable successively to admit pressure fluid first to said motor and second to said fluid-operated means.

3. The structure defined by claim 1 in which the valve means also controls the exhaust of pressure fluid from said fluid-operated means.

4. A portable cutting tool comprising in combination, a pole-like supporting member, a carriage mounted for longitudinal reciprocating movement on said member adjacent one end thereof, a pneumatic motor and a rotary cutting disc driven thereby secured to said carriage, the plane of said disc being parallel to the direction of movement of said carriage, a guard member having a forward edge adapted to rest against work to be cut secured to said one end of said supporting member, said guard member being disposed parallel to the plane of said disc and said carriage being normally in a position withdrawn from said one end so that the work engaging edge of said disc is disposed to the rear of said forward edge of said guard member, and pneumatic means for moving said carriage toward said one end to advance said disc past said forward edge of said guard member and into engagement with the work.

5. The structure defined by claim 4 in which the forward edge of said guard member is provided with teeth for securing engagement with the work to be cut.

6. In a portable cutting tool the combination comprising, an air cylinder having a longitudinal slot through the side wall thereof, a piston having an annular groove slideably mounted within said cylinder, a carriage mounted for longitudinal reciprocating movement on said cylinder, a pin secured to said carriage and projecting through said cylinder slot and into said piston groove, whereby said carriage is moved by said piston, a pneumatic motor and a rotary cutting disc driven thereby secured to said carriage, the plane of said disc being parallel to the direction of movement of said carriage, means for admitting air under pressure to said motor to rotate said disc, and means for admitting air under pressure to said cylinder to move said piston and thereby advance said disc into engagement with work to be cut.

7. A portable cutting tool comprising in combination, a tubular pole-like supporting member, a carriage mounted for longitudinal reciprocating movement on said member adjacent one end thereof, a pneumatic motor and a rotary cutting disc driven thereby secured to said carriage, the plane of said disc being parallel to the direction of movement of said carriage, a piston slideably mounted within said one end of said supporting member, said carriage being connected to said piston for movement thereby, an end cap secured on said one end of said supporting member, a guard member having a forward edge adapted to rest against work to be cut carried by said end cap, said guard member being disposed parallel to the plane of said disc, a coiled spring within said cylinder disposed between and bearing against said end cap and said piston, whereby said carriage normally is retained in a position withdrawn from said one end with the work engaging edge of said disc disposed to the rear of said forward edge of said guard member, conduits controlled by valves at the other end of said supporting member for admitting air under pressure to said motor to rotate said disc and for admitting air under pressure to said other end of said member, whereby admission of said pressure air to said member moves said piston forward and thereby advances said disc past said forward edge of said guard member and into cutting engagement with the work to be cut.

8. A portable cutting tool comprising in combination, a pole-like supporting member, a carriage mounted for longitudinal reciprocating movement on said member adjacent one end thereof, a pneumatic motor and a rotary cutting disc driven thereby secured to said carriage, the plane of said disc being parallel to the direction of movement of said carriage, a guard member having a forward edge adapted to rest against work to be cut secured to said one end of said supporting member, said guard member being disposed parallel to the plane of said disc, spring means for normally retaining said carriage in a position withdrawn from said one end with the work engaging edge of said disc disposed to the rear of said forward edge of said guard member, pneumatic means for moving said carriage toward said one end to advance said disc past said forward edge of said guard member and into cutting engagement with the work, a handle on the other end of said supporting member, said handle having a conduit therethrough one end of which is adapted to be connected to a source of air under pressure and the other end of which communicates with said motor, valve means in said conduit for controlling air flow therethrough, and means for admitting air under pressure to said pneumatic means.

9. The structure defined by claim 8 in which the communication between the conduit and the motor includes a flexible air hose.

10. The structure defined by claim 8 in which the means for admitting air under pressure to the pneumatic means includes a second conduit within the handle in communication with the first mentioned conduit and valve means in said second conduit for controlling air flow therethrough.

11. The structure defined by claim 8 including valve means within the handle for controlling the exhaust of pressure air from said pneumatic means.

ORVILLE JENKINS.

REFERENCES CITED

The following references are of record in the file of this patent:

UNITED STATES PATENTS

| Number | Name | Date |
|---|---|---|
| 1,030,832 | Riley | June 25, 1912 |
| 1,140,952 | Christensen | May 25, 1915 |
| 1,467,262 | Barker | Sept. 4, 1923 |
| 2,171,541 | Crouch | Sept. 5, 1939 |
| 2,406,482 | Tucker | Aug. 27, 1946 |